(12) United States Patent
Carroll

(10) Patent No.: US 7,128,357 B1
(45) Date of Patent: Oct. 31, 2006

(54) LOADING AND UNLOADING SYSTEM FOR A TRUCK HAVING A BED

(76) Inventor: Nena A. Carroll, 305 Shoshone, Commanche, TX (US) 76442

(*) Notice: Subject to any disclaimer, the term of this patent is extended or adjusted under 35 U.S.C. 154(b) by 0 days.

(21) Appl. No.: 11/153,175

(22) Filed: Jun. 15, 2005

(51) Int. Cl.
   B62D 33/03 (2006.01)
   B60R 3/02 (2006.01)

(52) U.S. Cl. .................... 296/61; 296/26.1; 296/26.08; 296/57.1

(58) Field of Classification Search .............. 296/50, 296/51, 57.1, 61, 37.6, 37.14, 39.2, 26.08–26.11; 14/69.5; 414/537
See application file for complete search history.

(56) References Cited

U.S. PATENT DOCUMENTS

| 3,010,760 | A | * | 11/1961 | Trautmann ................ 296/57.1 |
| 3,870,170 | A |   | 3/1975  | Noble et al. |
| 4,580,828 | A | * | 4/1986  | Jones ...................... 296/57.1 |
| 4,601,632 | A | * | 7/1986  | Agee ......................... 414/537 |
| 4,624,619 | A |   | 11/1986 | Uher |
| 4,685,857 | A | * | 8/1987  | Goeser et al. ............. 414/522 |
| 5,104,172 | A |   | 4/1992  | Schildt |
| 5,123,692 | A |   | 6/1992  | Couvillion |
| 5,257,894 | A |   | 11/1993 | Grant |
| 5,312,149 | A | * | 5/1994  | Boone ...................... 296/61 |
| D355,518  | S |   | 2/1995  | Belanger |
| 5,393,192 | A | * | 2/1995  | Hall et al. ................ 414/537 |
| D357,789  | S |   | 4/1995  | Port |
| 5,570,989 | A |   | 11/1996 | Belanger |
| 5,795,125 | A | * | 8/1998  | Walkden .................... 414/537 |
| D397,978  | S |   | 9/1998  | Helgeson et al. |
| 5,907,276 | A |   | 5/1999  | Lance |
| 6,276,738 | B1 | * | 8/2001 | Marshall .................. 296/57.1 |
| 6,302,465 | B1 | * | 10/2001 | Faber et al. ............. 296/39.1 |
| 6,328,366 | B1 |   | 12/2001 | Foster et al. |
| 6,390,761 | B1 |   | 5/2002  | Palmer, Jr. et al. |
| 6,464,278 | B1 | * | 10/2002 | Bailey ...................... 296/57.1 |
| 6,834,903 | B1 | * | 12/2004 | Harper et al. ............... 296/51 |
| 6,880,194 | B1 |   | 4/2005  | O'Donnell et al. |

FOREIGN PATENT DOCUMENTS

EP 0700806 8/1995

* cited by examiner

Primary Examiner—D. Glenn Dayoan
Assistant Examiner—Greg Blankenship
(74) Attorney, Agent, or Firm—Eric Karich

(57) ABSTRACT

A disclosed loading and unloading system for a truck having a bed includes a ramp, a first storage compartment formed under the bed and receiving the ramp, a ramp mounting assembly for mounting the ramp such that the ramp can be moved from a stored position to an extended position, a tailgate, a second storage compartment formed under the first storage compartment and receiving the tailgate, and a tailgate mounting assembly for mounting the tailgate such that the tailgate can be moved from an upright position to a lowered position, and to a retracted position. In the stored position the ramp is positioned within the first storage compartment. In the extended position the ramp extends outwardly from the first storage compartment through an opening. The tailgate blocks the first compartment opening in the upright position, and does not block the first compartment opening in the retracted position.

11 Claims, 4 Drawing Sheets

LOADING AND UNLOADING SYSTEM FOR A TRUCK HAVING A BED

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to loading and unloading systems, and more particularly to loading and unloading systems for trucks.

2. Description of Related Art

Ramps are commonly used to facilitate loading of objects into, and unloading objects from, truck beds. A problem arises when using a ramp with a typical pickup truck in that that the tailgate gets in the way, requiring a special extension that allows the ramp to extend out over the tailgate. There are various examples of this type of construction, including the following:

Walkden, U.S. Pat. No. 5,795,125, teaches an extendable ramp assembly for a pickup truck. The ramp assembly includes a platform assembly having a hollow interior that is bolted to the floor of the truck bed. A sliding platform is adjustably positioned within the platform assembly to allow for adjusting the angle of incline of an extendable ramp which is attached thereto. The sliding platform is adapted to extend over the tailgate, which remains in a standard position. A hinge plate is connected to the ramp to allow for a relatively smooth and continuous surface between the ramp and the top surface of the platform assembly.

Agee, U.S. Pat. No. 4,601,632, teaches a stowable ramp assembly that is fairly similar to the Walken reference. A generally thin, flat and elongated ramp sleeve is adapted for placement on a truck bed with the rearward end thereof positioned at the rearward end of the bed. An extension sleeve is telescopically slidable within the ramp sleeve and an elongated ramp is telescopically slidably received in the extension sleeve. The extension sleeve is rearwardly slidable to a working position over the lowered horizontal tailgate and the ramp is extendable rearwardly therefrom in the working position and connected to the extension sleeve for up and down pivotal movement of the rearward end of the ramp.

Other similar structures are shown in Noble, U.S. Pat. No. 3,870,170, Uher, U.S. Pat. No. 4,624,619, O'Donnell, et al., U.S. Pat. No. 6,880,194, Goeser, et al., U.S. Pat. No. 4,685,857, Grant, U.S. Pat. No. 5,257,894, Belanger, U.S. Pat. No. 5,570,989, Palmer, Jr., et al., U.S. Pat. No. 6,390,761, Lance, U.S. Pat. No. 5,907,276, Boone, U.S. Pat. No. 5,312,149, Belanger, U.S. Pat. No. 355,518, and Port, U.S. Pat. No. 357,789.

The prior art also teaches various other compartments in a truck undercarriage, including the following:

Foster, et al., U.S. Pat. No. 6,328,366, teaches a vehicle body with an undercarriage storage compartment for storing items such as a spare tire, tools and/or other types of equipment underneath a pick-up truck bed. The vehicle body includes a generally flat truck bed bottom member that extends in a longitudinal direction along the vehicle. The bottom member is mounted to a vehicle structure such as, a vehicle frame, chassis, or unibody member. The storage compartment has a support surface extending underneath the bottom member for supporting items such as the spare tire and associated tools. The storage compartment slides to an open position to allow access to the spare tire and tools and is then returned to a closed position to store the tire and tools within the storage compartment. In one embodiment, the support surface is tiltable to allow ramp access to the truck bed.

A stowable tailgate is also shown in the prior art, including the following:

Bailey, U.S. Pat. No. 6,464,278, teaches a vehicle tail gate mounted on sliding pivots wherein a channel portion of the sliding pivots are on the vehicle and have the initial entry portion sloping downwardly in a direction toward the front end of the vehicle. The tail gate has two spaced apart pins (each preferably with a roller thereon) on each of opposite edges and all four slide in the channels with one pair being on the sloping portion of the track thus by gravity biasing the tail gate into its retracted position in a storage compartment provided under a floor of the vehicle.

Jones, U.S. Pat. No. 4,580,828, and Couvillion, U.S. Pat. No. 5,123,692, teach other embodiments of a tailgate storable beneath a truck bed. P. C. Trautmann, U.S. Pat. No. 3,010,760, teaches a retractable tail gate for a station wagon.

It would thus be beneficial to have a loading and unloading system for a truck with a bed (such as a pickup truck) including a ramp that does not have to be completely removed from a storage area prior to use, and does not require an extension to extend out and over a tailgate.

SUMMARY OF THE INVENTION

A disclosed loading and unloading system for a truck having a bed includes a ramp, a first storage compartment formed under the bed and receiving the ramp, a ramp mounting assembly for mounting the ramp such that the ramp can be moved from a stored position to an extended position, a tailgate, a second storage compartment formed under the first storage compartment and receiving the tailgate, and a tailgate mounting assembly for mounting the tailgate such that the tailgate can be moved from an upright position to a lowered position, and to a retracted position. In the stored position the ramp is positioned within the first storage compartment. In the extended position the ramp extends outwardly from the first storage compartment through an opening. The tailgate blocks the first compartment opening in the upright position, and does not block the first compartment opening in the retracted position.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
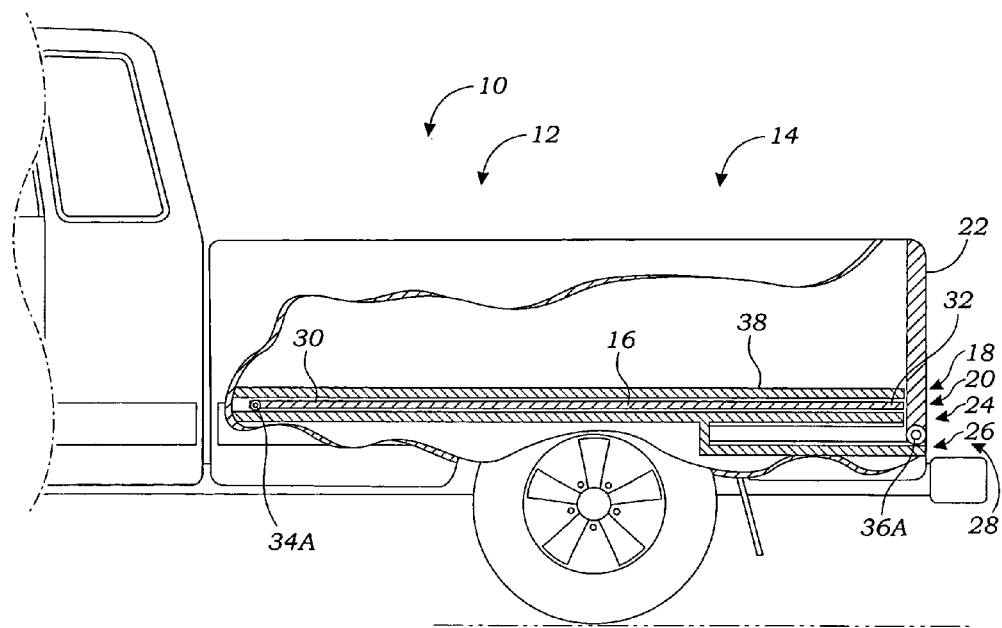
FIG. 1 is a side elevation view of a portion of a pickup truck having a bed that includes one embodiment of a loading and unloading system.

FIG. 1 is a side elevation view of a portion of a pickup truck 10 having a bed 12 that includes one embodiment of a loading and unloading system 14. In the embodiment of FIG. 1, the loading and unloading system 14 includes a ramp 16, a ramp storage compartment 18 formed under the bed 12 and adapted to receive the ramp 16, a ramp mounting assembly 20 positioned in the ramp storage compartment 18, a tailgate 22, a tailgate storage compartment 24 formed under the ramp storage compartment 18 and adapted to receive the tailgate 22, and a tailgate mounting assembly 26.

The ramp 16 is received in the ramp storage compartment 18 via the ramp mounting assembly 20 such that the ramp 16 can be moved between a stored position and an extended position. In the stored position of FIG. 1, the ramp 16 is located in the ramp storage compartment 18. In the extended position (see FIG. 4), the ramp 16 extends outwardly from the ramp storage compartment 18 through an opening 28 in the ramp storage compartment 18, and may advantageously be used to load objects into, and/or unload objects from, the bed 12 of the pickup truck 10.

The tailgate 22 is mounted to a rear portion of the bed 12 of the pickup truck 10 via the tailgate mounting assembly 26 such that the tailgate 22 can be moved from an upright position to a lowered position, and to a retracted position. In the upright position shown in FIG. 1, the tailgate 22 blocks the opening 28 in the ramp storage compartment 18 and impedes the movement of the ramp 16 to the extended position. In the lowered position (see FIG. 2), the tailgate 22 extends outwardly from a rear portion of the bed 12 of the pickup truck 10, allowing access to the bed 12 of the pickup truck 10. In the retracted position (see FIG. 3), the tailgate 22 is positioned within the tailgate storage compartment 24, and the tailgate 22 does not block the opening 28 in the ramp storage compartment 18 and does not impede movement of the ramp 16 to the extended position.

In the embodiment of FIG. 1, the ramp 16 has opposed right and left sides, a front end 30, and back end 32 opposite the front end 30. In the present embodiment, the ramp mounting assembly 20 includes a pair of wheels (shown in greater detail in FIG. 6) each extending outwardly from a different one of the sides at the front end 30. One if the wheels of the ramp 16 extending outwardly from a left side at the front end 30 is visible in FIG. 1, and is labeled 34A.

The ramp mounting assembly 20 further includes a pair of tracks adapted to retain the wheels of the ramp 16. The presently preferred embodiment is shown in greater detail in FIG. 6. While this embodiment is currently preferred, those skilled in the art will recognize that the ramp mounting assembly 20 could also include alternative structures, including posts rather than wheels, and various other forms of tracks, guides, sliders, rollers or other mechanisms known to those skilled in the art, and these alternative embodiments should be considered within the scope of the invention as claimed.

In general, the tailgate 22 has two opposed sides, and is similar to prior art tailgates. The tailgate mounting assembly 26 preferably includes a pair of posts each extending outwardly from a different one of the sides, and a mounting element adapted to retain the posts of the tailgate 22. More specifically, the tailgate 22 has opposed top and bottom portions, and each of the posts extends outwardly from a different one of the sides of the tailgate 22 at the bottom portion. In the embodiment of FIG. 1, each of the posts of the tailgate 22 is a roller, and the tailgate mounting assembly 26 includes a pair of tracks each adapted to retain a different one of the rollers of the tailgate 22. In FIG. 1, one of the rollers of the tailgate 22 extending outwardly from a left side at the bottom portion is visible in FIG. 1, and is labeled 36A.

As mentioned above with the ramp mounting assembly 20, while the described embodiment of the tailgate mounting assembly 26 is currently preferred, those skilled in the art will recognize that the tailgate mounting assembly 26 could also include alternative structures, including various forms of guides, sliders, rollers or other mechanisms known to those skilled in the art, and these alternative embodiments should be considered within the scope of the invention as claimed.

In the embodiment of FIG. 1, the ramp storage compartment 18 and the tailgate storage compartment 24 are positioned in a stacked arrangement wherein the tailgate storage compartment 24 is advantageously positioned under the ramp storage compartment 18 such that when the tailgate 22 is in the upright position shown in FIG. 1, the tailgate 22 blocks the opening 28 in the ramp storage compartment 18, thereby keeping the ramp 16 within the ramp storage compartment 18.

In the embodiment of FIG. 1, the ramp storage compartment 18 and the tailgate storage compartment 24 are integral, and the ramp storage compartment 18 has an upper wall 38 that forms a portion of a floor of the bed 12 of the pickup truck 10. (See FIG. 5.) In this embodiment, the integral ramp storage compartment 18 and tailgate storage compartment 24 are advantageously removable via the bed 12 (e.g., for maintenance and/or repair). In other embodiments, the ramp storage compartment 18 and the tailgate storage compartment 24 may be separate, and at least the ramp storage compartment 18 may be removable via the bed 12.

Figure 2:
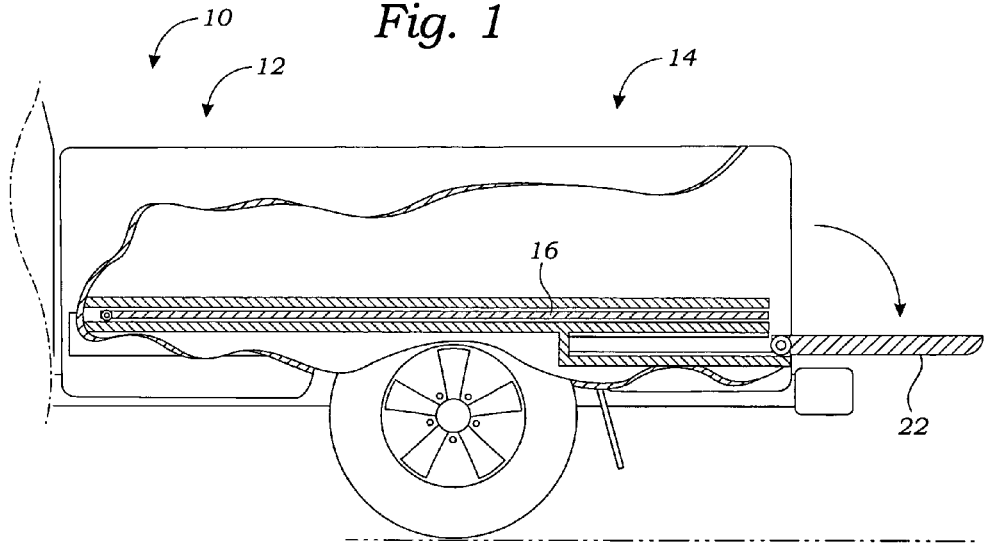
FIG. 2 is a side elevation view of the portion of the pickup truck of FIG. 1 wherein a tailgate of the loading and unloading system has been moved from an upright position to a lowered position.

FIG. 2 is a side elevation view of the portion of the pickup truck 10 of FIG. 1 wherein the tailgate 22 of the loading and unloading system 14 has been moved to the lowered position. In the lowered position of FIG. 2, the tailgate 22 extends outwardly from the rear portion of the bed 12 of the pickup truck 10, allowing access to the bed 12 of the pickup truck 10.

Figure 3:
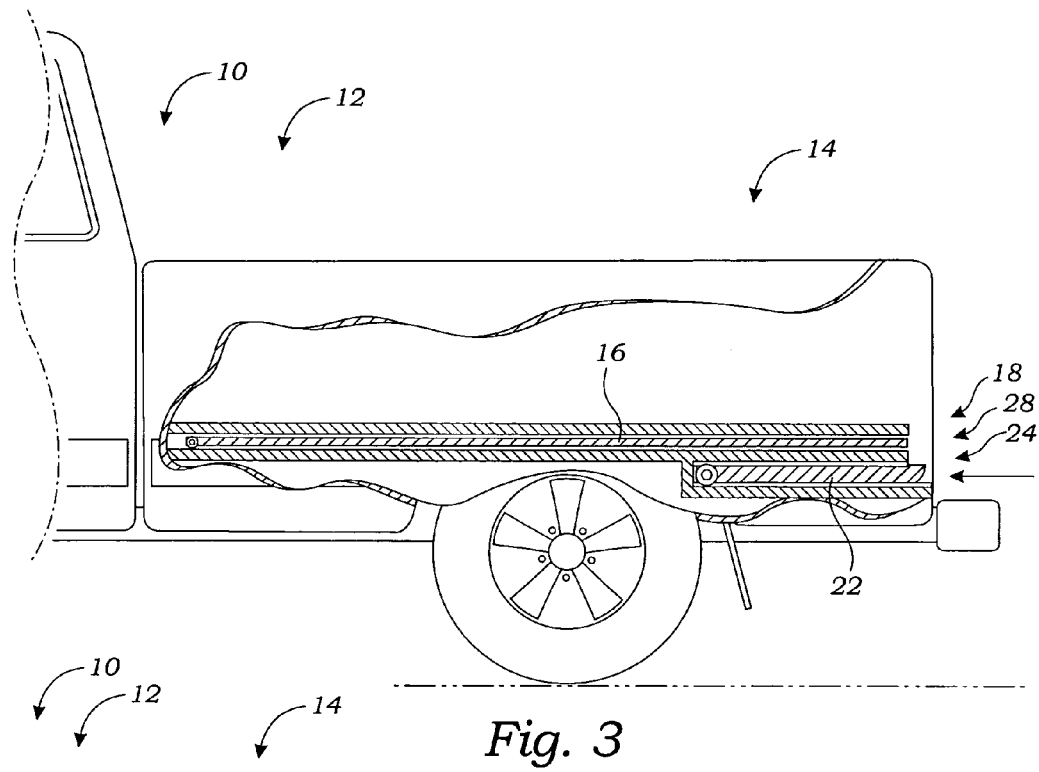
FIG. 3 is a side elevation view of the portion of the pickup truck of FIG. 2 wherein the tailgate has been moved to a retracted position.

FIG. 3 is a side elevation view of the portion of the pickup truck 10 of FIG. 2 wherein the tailgate 22 of the loading and unloading system 14 has been moved to the retracted position. In the retracted position of FIG. 3, the tailgate 22 is positioned within the tailgate storage compartment 24, and the tailgate 22 does not block the opening 28 in the ramp storage compartment 18 and does not impede movement of the ramp 16 to the extended position.

Figure 4:
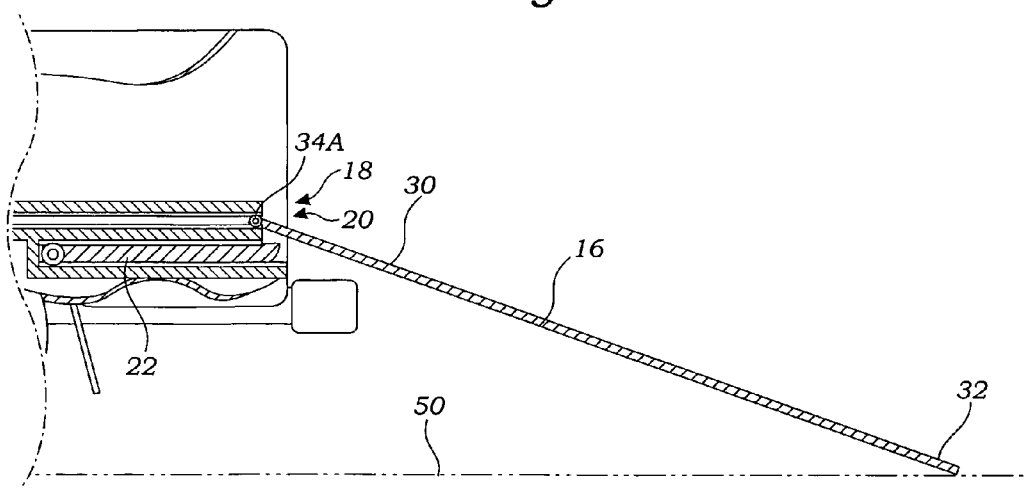
FIG. 4 is a side view of the portion of the pickup truck of FIG. 3 wherein a ramp of the loading and unloading system has been moved from a stored position to an extended position.

FIG. 4 is a side view of the portion of the pickup truck 10 of FIG. 3 wherein the ramp 16 has been moved to the extended position. In the embodiment of FIG. 4, when the ramp 16 is in the extended position, the wheels of the ramp 16 that extend outwardly from the sides at the front end 30 are retained within the tracks of the ramp mounting assembly 20, and the back end 32 of the ramp 16 is positioned on a ground surface 50 behind the pickup truck 10. In the extended position of FIG. 4, the ramp 16 may advantageously be used to load objects into, and/or unload objects from, the bed 12 of the pickup truck 10. It is noted that the ramp 16 is easily transitioned from the stored position (see FIGS. 1–3) to the extended position of FIG. 4 via the wheels, and there is advantageously no need to completely remove the ramp 16 from the ramp storage compartment 18 prior to use.

Figure 5:
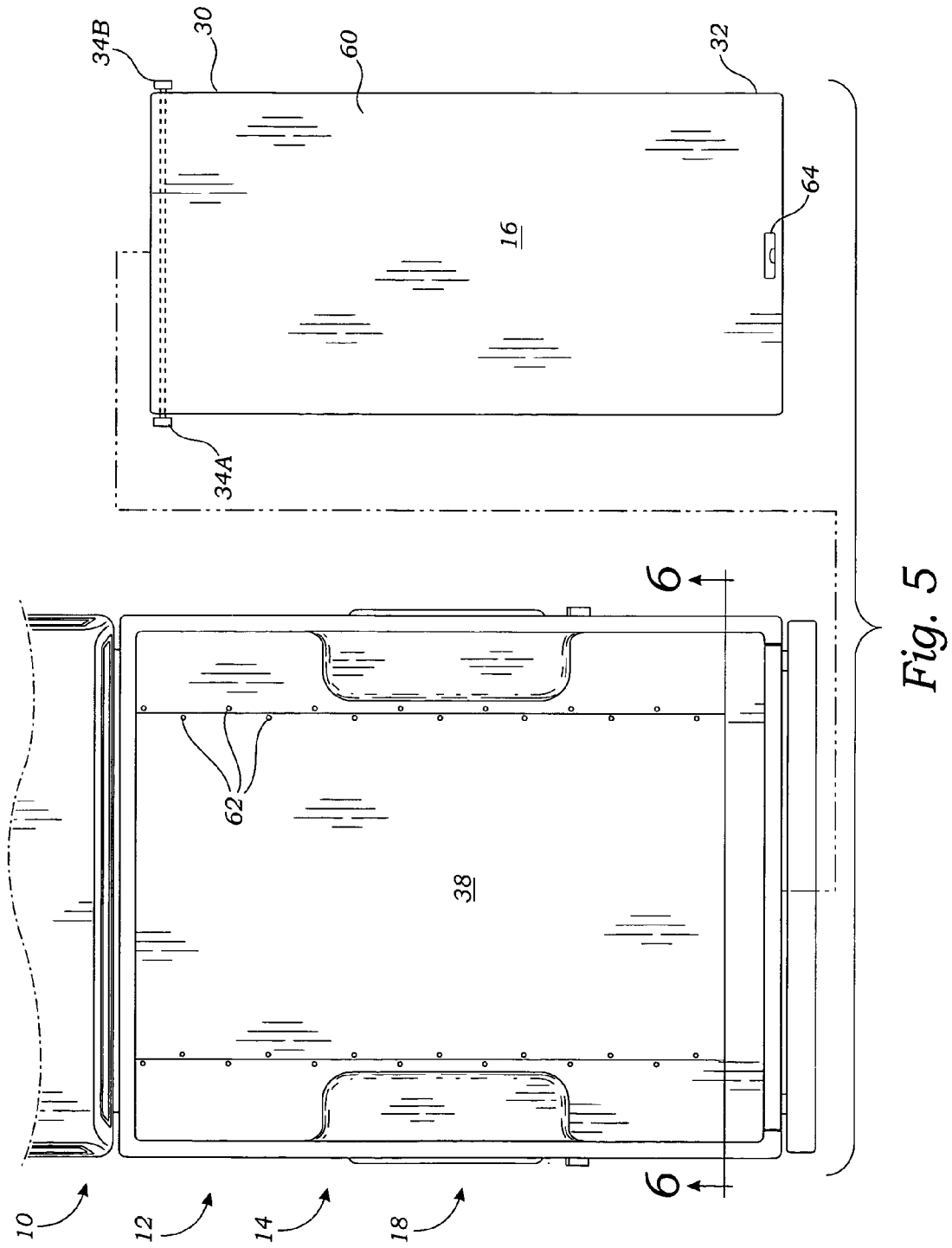
FIG. 5 is a top plan view of the portion of the pickup truck of FIG. 1 illustrating an upper wall of a ramp storage compartment of the loading and unloading system that forms a portion of a floor of the bed, and an upper surface of the ramp.

FIG. 5 is a top plan view of the portion of the pickup truck 10 of FIG. 1 illustrating the upper wall 38 of the ramp storage compartment 18 that forms a portion of a floor of the bed 12, and an upper surface 60 of the ramp 16. In the embodiment of FIG. 5, the ramp storage compartment 18 is mounted via multiple fasteners 62 (e.g., bolts or screws), and the ramp storage compartment 18 (and/or the tailgate storage compartment 24) may be advantageously removed via the bed 12 (e.g., for maintenance and/or repair) by removing the fasteners 62.

In the embodiment of FIG. 5, the upper surface 60 of the ramp 16 is substantially continuous, and substantially spans a length and width of the ramp storage compartment 18. An opening 64 extends through the upper surface 60 of the ramp 16 at the back end 32 to facilitate moving the ramp 16 between the stored position and the extended position.

In FIG. 5, the wheel of the ramp 16 that extends outwardly from the right side at the front end 30 is visible and labeled 34B.

Figure 6:
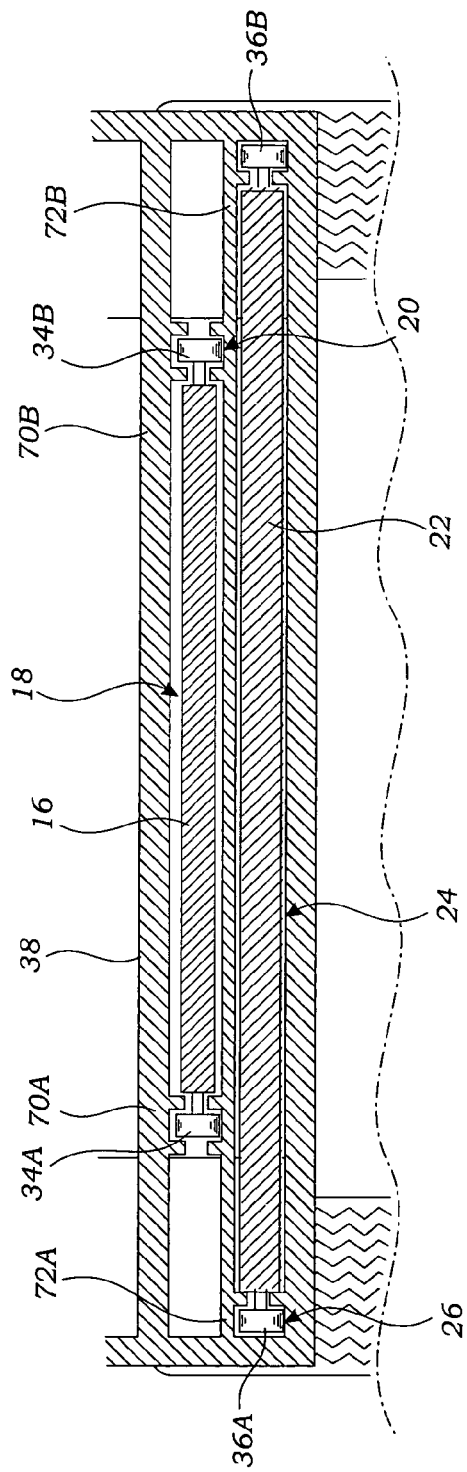
FIG. 6 is a rear elevation view of the portion of the pickup truck of FIG. 3 illustrating a rear portion of the loading and unloading system.

FIG. 6 is a rear elevation view of the portion of the pickup truck 10 of FIG. 3 illustrating a rear portion of the loading and unloading system 14. In FIG. 6, the ramp 16 is in the stored position within the ramp storage compartment 18, and the tailgate 22 is in the retracted position within the tailgate storage compartment 24. The ramp mounting assembly 20 has a track 70A adapted to retain the wheel 34A of the ramp 16, and another track 70B adopted to retain the wheel 34B of the ramp 16.

In FIG. 6, the roller of the tailgate 22 that extends outwardly from the right side at the bottom portion is visible and labeled 36B. The tailgate mounting assembly 26 includes a track 72A adapted to retain the roller 36A of the tailgate 22, and another track 72B adapted to retain the roller 36B of the tailgate 22.

Figure 7:
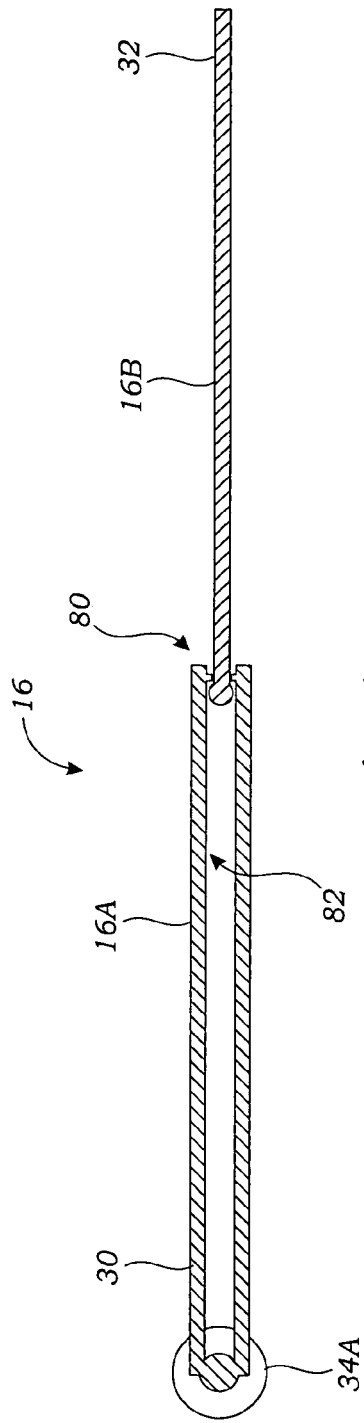
FIG. 7 is a cross section view of another embodiment of the ramp wherein the ramp includes two telescoping sections.

FIG. 7 is a cross section view of another embodiment of the ramp 16 of FIGS. 1–6 wherein the ramp 16 includes two telescoping sections 16A and 16B. In the embodiment of FIG. 6, the section 16A forms a front portion of the ramp 16, and includes the front end 30 of the ramp 16. The section 16A has an opening 80 at a back end adapted to receive the section 16B of the ramp 16, and a cavity 82 adapted to receive and retain the section 16B. The section 16B forms a rear portion of the ramp 16, and includes the back end 32 of the ramp 16. The section 16B can advantageously be extended from, or retracted into, the section 16A as desired to increase or reduce an angle formed between the ramp 16 and the ground surface 50 behind the pickup truck 10 (see FIG. 4).

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A loading and unloading system for a truck having a bed, the system comprising:
   a ramp;
   a first storage compartment formed under the bed of the truck and adapted to receive the ramp;
   a ramp mounting assembly for mounting the ramp such that the ramp can be moved from a stored position, wherein the ramp is positioned within the first storage compartment, to an extended position wherein the ramp extends outwardly from the first storage compartment through an opening in the first storage compartment;
   a tailgate;
   a second storage compartment formed under the first storage compartment and adapted to receive the tailgate; and
   a tailgate mounting assembly for mounting the tailgate such that the tailgate can be moved from an upright position, wherein the tailgate blocks the opening in the first storage compartment and impedes the movement of the ramp to the extended position, to a lowered position, and to a retracted position wherein the tailgate is positioned within the second storage compartment, wherein the tailgate does not block the opening in the first storage compartment and does not impede the movement of the ramp to the extended position.

2. The loading and unloading system as recited in claim 1, wherein the ramp has two opposed sides, two opposed ends, and a pair of wheels each extending outwardly from a different one of the sides at one of the ends of the ramp, and wherein the ramp mounting assembly is adapted to retain the wheels of the ramp.

3. The loading and unloading system as recited in claim 2, wherein the ramp mounting assembly comprises a pair of tracks each adapted to retain a different of the wheels of the ramp.

4. The loading and unloading system as recited in claim 1, wherein the tailgate has two opposed sides and a pair of posts each extending outwardly from a different one of the sides, and wherein the tailgate mounting assembly is adapted to retain the posts of the tailgate.

5. The loading and unloading system as recited in claim 4, wherein the tailgate has opposed top and bottom portions, and wherein each of the posts extends outwardly from a different one of the sides of the tailgate at the bottom portion.

6. The loading and unloading system as recited in claim 4, wherein each of the posts of the tailgate comprises a roller, and wherein the tailgate mounting assembly comprises a pair of tracks each adapted to retain a different one of the rollers of the tailgate.

7. The loading and unloading system as recited in claim 1, wherein the first and second storage compartments are positioned in a stacked arrangement.

8. The loading and unloading system as recited in claim 1, wherein the first and second storage compartments are integral.

9. The loading and unloading system as recited in claim 1, wherein the first storage compartment comprises an upper wall that forms a portion of a floor of the bed of the truck.

10. A loading and unloading system for a truck having a bed, the system comprising:
    a ramp;
    a first storage compartment formed under the bed of the truck and adapted to receive the ramp;

a ramp mounting assembly for mounting the ramp such that the ramp can be moved from a stored position, wherein the ramp is positioned within the first storage compartment, to an extended position wherein the ramp extends outwardly from the first storage compartment through an opening in the first storage compartment;

a tailgate;

a second storage compartment formed under the first storage compartment and adapted to receive the tailgate; and a tailgate mounting assembly for mounting the tailgate such that the tailgate can be moved from an upright position, wherein the tailgate blocks the opening in the first storage compartment and impedes the movement of the ramp to the extended position, to a lowered position, and to a retracted position wherein the tailgate is positioned within the second storage compartment, wherein the tailgate does not block the opening in the first storage compartment and does not impede the movement of the ramp to the extended position, wherein the first and second storage compartments are integral, and wherein at least the first storage compartment is removable via the bed of the truck.

11. The loading and unloading system as recited in claim 1, wherein the ramp comprises a plurality of telescoping sections.

* * * * *